(12) United States Patent
Iriyama et al.

(10) Patent No.: US 9,985,286 B2
(45) Date of Patent: May 29, 2018

(54) NEGATIVE ELECTRODE ACTIVE MATERIAL, METHOD FOR MANUFACTURING SAME, AND LITHIUM SECONDARY BATTERY

(71) Applicant: NEC Corporation, Tokyo (JP)

(72) Inventors: Jiro Iriyama, Tokyo (JP); Daisuke Kawasaki, Tokyo (JP); Emiko Fujii, Tokyo (JP); Shin Serizawa, Tokyo (JP); Hiroo Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 162 days.

(21) Appl. No.: 14/442,141

(22) PCT Filed: Oct. 28, 2013

(86) PCT No.: PCT/JP2013/079106
§ 371 (c)(1),
(2) Date: May 12, 2015

(87) PCT Pub. No.: WO2014/077113
PCT Pub. Date: May 22, 2014

(65) Prior Publication Data
US 2016/0285091 A1 Sep. 29, 2016

(30) Foreign Application Priority Data
Nov. 13, 2012 (JP) .................. 2012-249647

(51) Int. Cl.
*H01M 4/485* (2010.01)
*H01M 4/04* (2006.01)
(Continued)

(52) U.S. Cl.
CPC ......... *H01M 4/485* (2013.01); *H01M 4/0445* (2013.01); *H01M 4/0459* (2013.01);
(Continued)

(58) Field of Classification Search
CPC combination set(s) only.
See application file for complete search history.

(56) References Cited

U.S. PATENT DOCUMENTS 5,355,235 A * 10/1994 Nishizawa .......... H01L 51/0094
257/40
5,725,968 A * 3/1998 Sato .................... H01B 1/04
429/231.4

(Continued)

FOREIGN PATENT DOCUMENTS

EP   1 291 321 A1   3/2003
JP   2997741        1/2000

(Continued)

OTHER PUBLICATIONS

International Search Report dated Dec. 3, 2013 in corresponding PCT International application.

(Continued)

*Primary Examiner* — Imran Akram
(74) *Attorney, Agent, or Firm* — Finnegan, Henderson, Farabow, Garrett & Dunner, L.L.P.

(57) ABSTRACT

A negative electrode active material comprising silicon oxide satisfying the following Equation 1 and Equation 2 when solid state NMR ($^{29}$Si-DDMAS) of silicon is measured for the silicon oxide after performing charging at least once is excellent in the performance as a negative electrode active material for a lithium secondary battery;

$$0.42 \leq S1/(S1+S2+S3) \leq 0.55 \quad \text{(Equation 1)}$$

$$0.21 \leq S3/(S1+S2+S3) \leq 0.26, \quad \text{(Equation 2)}$$

in which S1 is a sum of peak areas of a group of signals assigned to Si having a Si—Si bond and having peaks at 0 to −15 ppm, −55 ppm, −84 ppm and −88 ppm, S2 is a sum of peak areas of a group of signals assigned to Si having a (Continued)

$Si(OH)_{4-n}(OSi)_n$ (n=3, 4) structure and having peaks at −100 ppm and −120 ppm, and S3 is a sum of peak areas of a group of signals assigned to Si having a $Si(OLi)_{4-n}(OSi)_n$ (n=0, 1, 2, 3) structure and having peaks at −66 ppm, −74 ppm, −85 ppm and −96 ppm.

4 Claims, 1 Drawing Sheet

(51) Int. Cl.
*H01M 10/0525* (2010.01)
*H01M 4/1391* (2010.01)
*H01M 4/02* (2006.01)

(52) U.S. Cl.
CPC ..... *H01M 4/1391* (2013.01); *H01M 10/0525* (2013.01); *H01M 2004/027* (2013.01)

(56) References Cited

U.S. PATENT DOCUMENTS

| | | | | |
|---|---|---|---|---|
| 2001/0018037 A1* | 8/2001 | Fukuoka | ............... | C01B 33/113 423/335 |
| 2003/0053945 A1* | 3/2003 | Fukuoka | ............... | C01B 33/113 423/332 |
| 2003/0118905 A1* | 6/2003 | Fukuoka | ............... | C09C 1/3045 429/218.1 |
| 2009/0239151 A1 | 9/2009 | Nakanishi et al. | | |
| 2010/0055563 A1* | 3/2010 | Nakanishi | ............. | H01M 4/364 429/209 |
| 2011/0244328 A1* | 10/2011 | Iriyama | ................ | H01M 4/134 429/218.1 |
| 2014/0106226 A1* | 4/2014 | Hayashi | ................ | C01G 49/06 429/221 |
| 2015/0115206 A1* | 4/2015 | Fujii | .................... | H01M 4/134 252/506 |

FOREIGN PATENT DOCUMENTS

| | | |
|---|---|---|
| JP | 2001-216961 | 8/2001 |
| JP | 2003-160328 | 6/2003 |
| JP | 2004-63433 | 2/2004 |
| JP | 3952118 | 8/2007 |
| JP | 2009-76372 | 4/2009 |
| JP | 2009-76373 | 4/2009 |
| JP | 4288455 | 7/2009 |
| JP | 2009-259723 | 11/2009 |
| JP | 2010-160982 | 7/2010 |
| JP | 2010-160984 | 7/2010 |
| JP | 2010-263058 | 11/2010 |
| JP | 4752992 | 8/2011 |
| JP | 2012-14939 | 1/2012 |
| JP | 2012-164624 | 8/2012 |
| JP | 2012-209195 | 10/2012 |
| WO | WO 2012/015033 | 2/2012 |
| WO | WO 2012164834 A1 * | 12/2012 ............. C01G 49/06 |

OTHER PUBLICATIONS

Extended European Search Report dated Oct. 27, 2016, by the European Patent Office in counterpart European Patent Application No. 13854521.5.

Notification of Reasons for Refusal dated Jan. 4, 2018, by Japanese Patent Office in counterpart Japanese Patent Application 2014-546924.

* cited by examiner

NEGATIVE ELECTRODE ACTIVE MATERIAL, METHOD FOR MANUFACTURING SAME, AND LITHIUM SECONDARY BATTERY

CROSS-REFERENCE TO RELATED PATENT APPLICATIONS

This application is a National Stage Entry of International Application No. PCT/JP2013/079106, filed Oct. 28, 2013, which claims priority from Japanese Patent Application No. 2012-249647, filed Nov. 13, 2012. The entire contents of the above-referenced applications are expressly incorporated herein by reference.

TECHNICAL FIELD

The present invention relates to a negative electrode comprising a lithium-containing silicon oxide and a method for manufacturing the same, and further relates to a lithium secondary battery using the negative electrode. The present invention also relates to an evaluation method for a negative electrode active material.

BACKGROUND ART

Various batteries have been proposed to date as a lithium secondary battery comprising silicon oxide in its negative electrode. For example, Patent Literature 1 describes, as preferable methods for preparing silicon oxide or silicate containing lithium, a synthetic method including mixing simple substance(s) or compound(s) of lithium, silicon, another metallic element or nonmetallic element, and the like in a prescribed molar ratio and heating in the air or an atmosphere containing oxygen, and a method including subjecting silicon oxide to absorb lithium ion thereinto by an electrochemical reaction between silicon oxide, such as silicon dioxide $SiO_2$ or silicon monoxide SiO, and lithium or a substance containing lithium (Patent Literature 1, paragraphs 0011 and 0016).

Patent Literatures 2 to 7 describe that the silicon oxide preferably used as an electrode material satisfies that when a spectrum of the silicon oxide is measured by solid state NMR (29SiDD/MAS) with a sufficient relaxation time set, two peaks of a broad peak (A1) centered at −70 ppm and a broad peak (A2) centered at −110 ppm are separately measured, and an area ratio between these peaks (A1/A2) has a value falling in a range of 0.1≤A1/A2≤1.0.

CITATION LIST

Patent Literature

Patent Literature 1: Japanese Patent No. 2997741
Patent Literature 2: Japanese Patent Publication No. 3952118
Patent Literature 3: Japanese Patent Laid-Open No. 2001-216961
Patent Literature 4: Japanese Patent Publication No. 4752992
Patent Literature 5: Japanese Patent Publication No. 4288455
Patent Literature 6: Japanese Patent Laid-Open No. 2004-063433
Patent Literature 7: Japanese Patent Laid-Open No. 2009-259723

SUMMARY OF INVENTION

Technical Problem

Patent Literatures 2 to 7 describe that silicon oxide is measured by the solid state NMR (29SiDD/MAS) to determine whether it is suitable as a negative electrode active material. However, the measurement was made for the active material in the state containing no lithium, and not for that in a lithium-doped state.

When silicon oxide is used in a negative electrode of a battery, it is doped with lithium through charging. As described in Patent Literature 1 mentioned above, there are various methods for doping silicon oxide with lithium. Whereas, there is a certain limitation to find out a negative electrode active material having high performance by using the evaluation of silicon oxide not containing lithium as described in Patent Literatures 2 to 7.

As a result of investigation made by the present inventors, it was found that the $^{29}$Si-DDMAS spectrum of silicon oxide changes when the silicon oxide is doped with lithium and that the change is largely varied depending on a doping amount of lithium and a doping method. Specifically, in the $^{29}$Si-DDMAS spectrum of silicon oxide doped with lithium, peaks appear in addition to those in the vicinity of −70 ppm, −84 ppm and −110 ppm described in Patent Literatures 2 to 7, and it is difficult to obtain a battery having high performance unless these peaks are controlled to fall in a proper range.

Specifically, an object of the present invention is to provide a negative electrode for a lithium secondary battery and a lithium secondary battery having excellent properties.

Solution to Problem

The present is characterized by that a negative electrode active material comprises silicon oxide which satisfies the following Equation 1 and Equation 2 when solid state NMR ($^{29}$Si-DDMAS) of silicon is measured for the silicon oxide after performing charging at least once, $$0.42 \leq S1/(S1+S2+S3) \leq 0.55 \quad \text{(Equation 1)}$$

$$0.21 \leq S3/(S1+S2+S3) \leq 0.26, \quad \text{(Equation 2)}$$

in which S1 is a sum of peak areas of a group of signals assigned to Si having a Si—Si bond and having peaks at 0 to −15 ppm, −55 ppm, −84 ppm and −88 ppm, S2 is a sum of peak areas of a group of signals assigned to Si having a $Si(OH)_{4-n}(OSi)_n$ (n=3, 4) structure and having peaks at −100 ppm and −120 ppm, and S3 is a sum of peak areas of a group of signals assigned to Si having a $Si(OLi)_{4-n}(OSi)_n$ (n=0, 1, 2, 3) structure and having peaks at −66 ppm, −74 ppm, −85 ppm and −96 ppm.

Advantageous Effects of Invention

According to the present invention, a negative electrode for a lithium secondary battery and a lithium secondary battery having excellent properties can be provided. In addition, according to one aspect of the present invention, a method for manufacturing a negative electrode for a lithium secondary battery having an excellent characteristic can be provided.

DESCRIPTION OF EMBODIMENT

<Calculation of Peak Area in Solid State NMR>

A method for obtaining sums S1 to S3 will be described. Solid state NMR ($^{29}$Si-DDMAS (Dipolar Decoupling/Magic Angle Spinning)) peaks corresponding to principal Si present in silicon oxide doped with Li (including doping through charging) are divided into the following three groups:

(S1 Peak Group)

A group of signals having peaks at chemical shifts of 0 to −15 ppm, −55 ppm, −84 ppm and −88 ppm (hereinafter sometimes designated as the S1 peak group for simplification). These peaks are assigned to Si having a Si—Si bond. A sum of the peak areas of the S1 peak group is defined as the sum S1.

(S2 Peak Group)

A group of signals having peaks at chemical shifts of −100 ppm and −120 ppm (hereinafter sometimes designated as the S2 peak group for simplification). These peaks are assigned to Si having a Si(OH)$_{4-n}$(OSi)$_n$ (n=3, 4) structure. A sum of the peak areas of the S2 peak group is defined as the sum S2.

(S3 Peak Group)

A group of signals having peaks at chemical shifts of −66 ppm, −74 ppm, −85 ppm and −96 ppm (hereinafter sometimes designated as the S3 peak group for simplification). These peaks are assigned to Si having a Si(OLi)$_{4-n}$(OSi)$_n$ (n=0, 1, 2, 3) structure. A sum of the peak areas of the S3 peak group is defined as the sum S3.

(Determination of Each Peak Area)

Figure 2:
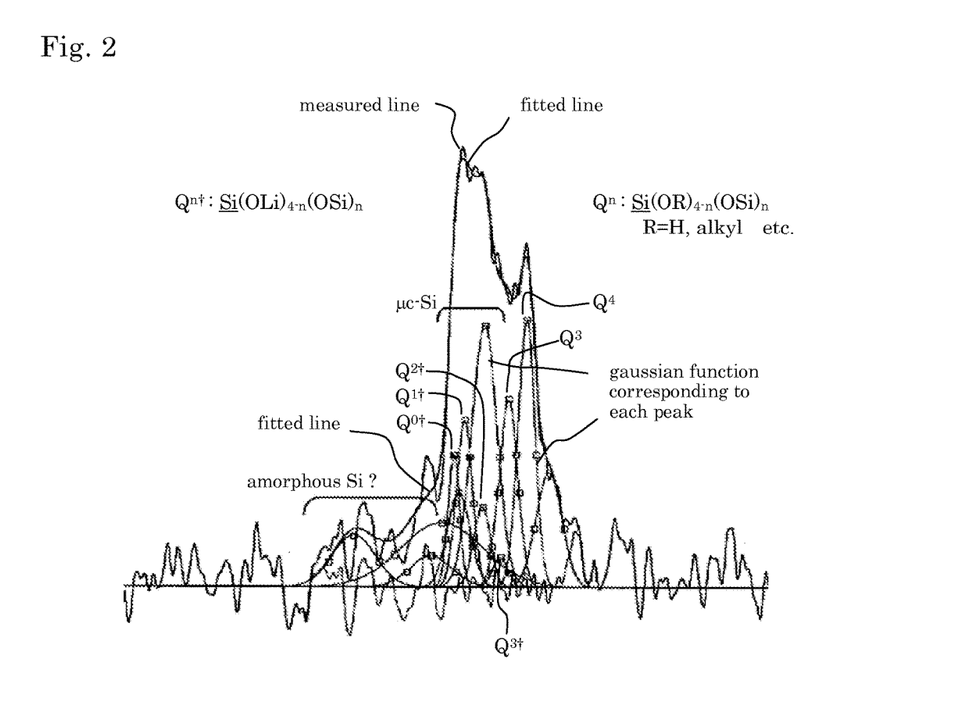
FIG. 2 is a diagram illustrating a solid NMR ($^{29}$Si-DDMAS) spectrum of silicon oxide doped with Li and an example of the fitting of the spectrum.

In a solid state NMR ($^{29}$Si-DDMAS) spectrum of silicon oxide doped with Li (including doping through charging), the S1 to S3 peak groups overlap one another as in an example illustrated in FIG. 2.

Therefore, in order to obtain the intensities of the respective peaks, the respective peaks are expressed by using arbitrary Gaussian functions, and these Gaussian functions are superposed so as to fit the original data. After the superposition of the original data and the Gaussian functions reach in agreement, the area of each peak can be calculated to obtain the intensity of each peak. It is noted that a spinning side band generated by the MAS (Magic Angle Spinning) is removed from the data before performing the fitting. A spinning side band and a true peak can be distinguished from each other by measuring whether a peak shift is observed when the rotation speed of the MAS is changed. If a peak shift is observed, it is a spinning side band, and if not, it is a true peak.

Among the peaks of the signals defined in the present invention, the positions of the peaks of the signal having a peak at −84 ppm belonging to the S1 peak group and −85 ppm belonging to the S3 peak group are extremely close to each other. In performing the fitting, the signal having a peak at −85 ppm belonging to the S3 peak group is preferentially used out of these two peaks, and if the signals have the same concordance rate of the fitting with the original data, the superposition which gives a higher intensity to this peak is preferentially employed.

As software capable of performing such peak search, data fitting and area calculation, for example, Origin (data analysis software manufactured by OriginLab Corporation, see http://www.lightstone.co.jp/origin/pa.htm) can be used. This software has an NLSF (Nonlinear Least Squares Fitter) in which a least-squares method is applied, and can fit a curve having a plurality of arbitrary peaks by using a Gaussian function.

In addition, the solid state NMR measurement is performed to a negative electrode that is constituted by using a negative electrode active material comprising silicon oxide and has been charged at least once. In other words, in the present invention, the performance of a negative electrode active material can be evaluated by measuring the Si-NMR in a state where it has been charged at least once to absorb Li.

Specifically, after constituting a battery by using a negative electrode active material and performing charging at least once, a negative electrode is taken out as a measurement sample for performing the NMR measurement, and thus, the evaluation can be made. Incidentally, as described in examples later, it is preferable to actually produce a battery and charge it at least once (for example, once) before measuring the NMR, but a simulated battery may be produced instead.

In general, as the performance is degraded through repeated charging/discharging, the NMR of an active material tends to be out of the range of Equation 1 or Equation 2. Accordingly, if the NMR of silicon oxide that is a negative electrode active material in a charged state after performing the charging/discharging twice or more satisfies Equation 1 and Equation 2, it is estimated that the active material satisfies Equation 1 and Equation 2 also after performing the charging once. Accordingly, in general, a negative electrode having been charged once can be used for measuring the NMR.

Accordingly, the present invention embraces, as the scope of rights, both a negative electrode active material before charging (an active material before charging that will satisfy Equation 1 and Equation 2 when charged at least once) and a negative electrode active material having been charged at least once. In the description given above and below, a "silicon oxide" and a "negative electrode active material" may mean those both before and after charging in some cases, or those either before or after charging in the other cases, which will be apparent from the context.

DESCRIPTION OF EMBODIMENT

As a result of intensive studies made by the present inventors, it has been found that properties as a negative electrode active material, namely, initial charge/discharge efficiency and a charge/discharge cycle characteristic, of a lithium-containing silicon oxide relate to a ratio among Si having a Si—Si bond, Si having a Si(OH)$_{4-n}$(OSi)$_n$ (n=3, 4) structure, and Si having a Si(OLi)$_{4-n}$(OSi)$_n$ (n=0, 1, 2, 3) structure.

The silicon having a Si—Si bond giving the S1 peak group contains crystalline silicon, amorphous silicon, nanocluster silicon and the like formed in the inside of silicon oxide.

The silicon having a Si(OH)$_{4-n}$(OSi)$_n$ (n=3, 4) structure giving the S2 peak group contains crystalline SiO$_2$, amorphous SiOx (x=0.8 to 2), such oxides having —OH group on the surfaces thereof through a reaction with water, and the like.

The silicon having a Si(OLi)$_{4-n}$(OSi)$_n$ (n=0, 1, 2, 3) structure giving the S3 peak group contains crystalline lithium silicates such as Li$_4$SiO, Li$_8$SiO$_6$, Li$_2$SiO$_3$, Li$_2$Si$_2$O$_5$ and Li$_2$Si$_3$O$_7$, amorphous Li$_x$Si$_y$O (x=0.2 to 4, y=0.17 to 1), and the like.

In all silicons contained in silicon oxide used in a negative electrode, when the ratio occupied by the silicon having a Si—Si bond $\{=S1/(S1+S2+S3)\}$ satisfies Equation 1:

$$0.42 \leq S1/(S1+S2+S3) \leq 0.55, \quad \text{(Equation 1)}$$

a resultant secondary battery shows a good charge/discharge cycle characteristic. If the ratio occupied by the silicon having a Si—Si bond exceeds 0.55, the volume change of the silicon oxide caused in the charging/discharging becomes large, and as a result, the active material is easily peeled off from the electrode, and thus, the cycle characteristic is easily degraded.

Alternatively, if the ratio occupied by the silicon having a Si—Si bond is smaller than 0.42, the amount of Si that can be involved in the charging/discharging becomes so small that a charge/discharge capacity is easily decreased.

In all the silicons contained in the silicon oxide, as the ratio of the S2 peak group, namely, the silicon having a $Si(OH)_{4-n}(OSi)_n$ (n=3, 4) structure, is larger, the initial charge/discharge efficiency is lower. The $Si(OH)_{4-n}(OSi)_n$ (n=3, 4) structure can absorb lithium but is difficult to desorb it, and therefore, as the ratio of the S2 peak group is increased, an irreversible capacity is increased to degrade the charge/discharge efficiency. Accordingly, the ratio of the S2 peak group is preferably smaller.

In all the silicons contained in the silicon oxide, when the ratio occupied by the silicon having a $Si(OLi)_{4-n}(OSi)_n$ (n=0, 1, 2, 3) structure $\{=S3/(S1+S2+S3)\}$ is small, the irreversible capacity is increased to degrade the charge/discharge efficiency, and therefore, $S3/(S1+S2+S3)$ is preferably larger. In particular, if it is 0.21 or more, the charge/discharge efficiency is good. With respect to a lithium silicate, however, it is difficult to synthesize a lithium silicate having a composition containing Li in a larger molar ratio than $Li_4SiO$, and hence the ratio is generally 0.26 or less. Accordingly, if the following Equation 2 is satisfied:

$$0.21 \leq S3/(S1+S2+S3) \leq 0.26, \quad \text{(Equation 2)}$$

a resultant secondary battery shows good charge/discharge efficiency.

As described so far, in one embodiment of the present invention, when Equation 1 and Equation 2 are satisfied, a second battery negative electrode excellent in the initial charge/discharge efficiency and the charge/discharge cycle characteristic is obtained.

A method for manufacturing the negative electrode active material (the active material before charging) of the present embodiment is not especially limited, but it is preferable to manufacture the negative electrode active material by doping silicon oxide with lithium before incorporating it into a battery (hereinafter which process will be designated as lithium pre-doping).

As a method of lithium pre-doping, (i) a method utilizing thermal diffusion of lithium (hereinafter referred to as the thermal pre-doping) and (ii) a method of electrochemically doping lithium (hereinafter referred to as the electrochemical pre-doping) are typically employed, but any other method may be employed.

The method (i) of the thermal pre-doping is performed by heating silicon oxide and a lithium source in a state in contact with each other. The timing of the contact is arbitrarily determined, and in one preferable embodiment, after producing a negative electrode by using silicon oxide (herein, the negative electrode may or may not be in a final shape as the negative electrode), more specifically, as described later, after applying silicon oxide onto a collector together with a binder, and a conductivity imparting agent if necessary, and forming the resultant into a prescribed shape, a lithium in a metallic state or in a state of compound having activity close to that of a metal is brought into contact with the negative electrode.

In order to attain a uniform contact with the electrode, the lithium source is preferably in a sheet shape. Examples of the lithium source in a sheet shape include a rolled lithium foil and a vapor deposited lithium foil. Examples of a substrate of the sheet include a metal such as copper and a plastic film such as PET. After bringing the lithium source into contact with the electrode, heating is performed. At this point, if the temperature exceeds a melting point of metallic lithium (180.5° C.), molten lithium flows to a portion other than the electrode and hence the lithium cannot be efficiently diffused, and therefore, the heating is performed preferably at a temperature equal to or lower than the melting point of metallic lithium. Specifically, the heating temperature is preferably 70° C. or more and 180.5° C. or less, and more preferably 80° C. or more and 150° C. or less. The heating time depends also on the heating temperature, and is generally 1 hour to 48 hours, and preferably 8 hours to 16 hours. Incidentally, since metallic lithium vigorously reacts with water, all operations are preferably performed under a low humidity environment.

Alternatively, the thermal pre-doping may be performed, at an arbitrary stage before forming a negative electrode, by mixing silicon oxide (or a mixture containing silicon oxide and other battery materials) and a lithium source and subjecting the resultant to a heat treatment. The heat treatment temperature is not especially limited, and is, for example, 70° C. or more and 800° C. or less. Examples of the lithium source include metallic lithium, an organic lithium compound, hydrogenated lithium, and hydrogenated lithium aluminum. If the thermal pre-doping is performed before forming a negative electrode, the lithium source is preferably metallic lithium, and the heating temperature is preferably 70° C. or more, and more preferably 80° C. or more and 150° C. or less.

The method (ii) of the electrochemical pre-doping can be practiced as follows: After producing a negative electrode by using silicon oxide (herein, the negative electrode may or may not be in a final shape as the negative electrode), more specifically, as described later, after applying silicon oxide onto a collector together with a binder, and a conductivity imparting agent if necessary, and forming the resultant into a prescribed shape, the resultant electrode is used as one electrode (a working electrode), a substance containing metallic lithium or lithium is used as another electrode (a counter electrode), an electrochemical battery is constituted by allowing these electrodes to oppose to each other to be in contact with a lithium ion conductive nonaqueous electrolyte, and the silicon oxide is electrochemically doped with a lithium ion by allowing an appropriate current to flow in a direction for causing a cathode reaction in the working electrode.

A negative electrode active material satisfying the prescribed conditions defined in the present embodiment can be obtained by appropriately selecting conditions for the lithium pre-doping described above and combining with another condition if necessary.

For example, it was found that the area ratio among the S1 to S3 peak groups differs between a case where lithium is doped in silicon oxide by the thermal pre-doping method and a case where the same amount of lithium is doped in silicon oxide by the electrochemical pre-doping. Specifically, it was found that a state of silicon present in silicon oxide is different depending on the conditions for the lithium pre-doping. It was also found that a distribution state of the lithium is different depending on the conditions for the lithium doping.

Specifically, if a reaction is caused between silicon oxide and lithium by the electrochemical pre-doping method alone, the lithium reacts merely in the vicinity of the surface of the silicon oxide, and hence, a ratio of the silicon having a $Si(OH)_{4-n}(OSi)_n$ (n=3, 4) structure becomes large. Alternatively, if a reaction is caused between silicon oxide and lithium by the heating method alone, silicon clusters of the silicon oxide grows by the heating, and hence, a ratio of the silicon having a Si—Si bond becomes large.

Accordingly, in a preferred embodiment, the thermal pre-doping and the electrochemical pre-doping are appropriately combined. More preferably, after practicing the thermal pre-doping, the electrochemical pre-doping is practiced. In this case, in the thermal pre-doping performed first, in order that silicon clusters do not grow, the doping is preferably performed in a temperature range of, for example, 80 to 120° C. to attain a doping amount of 5% to 70%, preferably 15% to 40% of the whole amount of lithium doped. In the thermal pre-doping, lithium is doped comparatively uniformly even in the inside of the silicon oxide. After doping lithium once to some extent by the thermal pre-doping, a necessary amount of lithium can be doped by the electrochemical pre-doping while inhibiting the growth of silicon clusters.

In this manner, while retaining the ratio occupied by the silicon having a Si—Si bond in all silicons contained in silicon oxide within a range for showing a good charge/discharge cycle characteristic, the ratio, in all the silicons contained in the silicon oxide, of the silicon having a $Si(OLi)_{4-n}(OSi)_n$ (n=0, 1, 2, 3) structure can be set to 0.21% or more.

Besides, when the silicon oxide before the pre-doping is expressed as $SiO_x$, x is in a range of preferably approximately 0.5 to 1.6, and more preferably 0.9 to 1.45. By selecting suitable one from these silicon oxides and practicing the above-described pre-doping, a desired silicon oxide can be obtained. In such silicon oxide, a fine Si cluster is dispersed in the oxide in general, but the size and the distribution of the Si cluster are changed through the lithium pre-doping, so that the area ratio of the S1 peak group assigned to the Si having a Si—Si bond can be changed.

A lithium secondary battery of the present invention includes, as a negative electrode active material, at least silicon oxide satisfying Equation 1 and Equation 2 as described above. Constituting elements of the negative electrode in addition to the silicon oxide, and other constituting elements of the battery will now be described.

<Constituting Elements of Negative Electrode>
(Collector)

A metal contained in a collector is preferably a metal that does not form an alloy with Li. Examples of the collector include copper, nickel and alloys thereof. The collector can be in the shape of a foil, a plate or a mesh.

As the collector, a foil or a mesh containing copper as a principal component is particularly preferred. For example, a ratio of copper in the collector is preferably 97 to 100% by mass from the viewpoint of conductivity and heat resistance.

(Negative Electrode Active Material)

According to the present invention, the negative electrode active material contains at least the silicon oxide satisfying Equation 1 and Equation 2 as described above. Accordingly, the negative electrode active material may contain merely the silicon oxide satisfying Equation 1 and Equation 2, and in addition, may contain a known negative electrode active material in combination.

Specific examples of the active material, to be used in addition to the silicon oxide, include carbon materials such as graphite, coke and hard carbon, lithium alloys such as a lithium-aluminum alloy, a lithium-lead alloy and a lithium-tin alloy, metallic lithium, and a metal oxide having a lower potential than a lithium manganese composite oxide, such as $SnO_2$, $SnO$, $TiO_2$ or $Nb_2O_3$.

If an active material to be used in addition to the silicon oxide is contained, for example, graphite is preferably contained as the negative electrode active material in addition to the silicon oxide satisfying Equation 1 and Equation 2. It is also preferable that the silicon oxide is coated with graphite.

The content of the active material in an active material layer (a layer of the negative electrode excluding the collector) is preferably 40% by mass or more and 99% by mass or less, more preferably 50% by mass or more and 95% by mass or less, and further more preferably 65% by mass or more and 90% by mass or less from the viewpoint of improvement of energy density.

(Conductivity Imparting Agent)

The active material layer may further contain a conductivity imparting agent from the viewpoint of improvement of conductivity. The conductivity imparting agent is not especially limited, and for example, any known conductivity imparting agent may be used. An example of the conductivity imparting agent includes a carbon material. Examples of the carbon material include graphite, amorphous carbon, diamond-like carbon, carbon black, ketjen black, acetylene black, vapor grown carbon fiber, fullerene, carbon nanotube and composites of these. These conductivity imparting agents may be used alone, or two or more of these may be used together. Incidentally, highly crystalline graphite has high electric conductivity and is good in adhesion to a collector made of a metal such as copper and in voltage flatness. On the other hand, low crystalline amorphous carbon shows comparatively small volume expansion, and hence shows a high effect to reduce the volume expansion of the negative electrode as a whole, and is difficult to be degraded due to ununiformity such as a grain boundary or a defect.

The content of the conductivity imparting agent in the active material layer is preferably 1% by mass or more and 25% by mass or less, more preferably 2% by mass or more and 20% by mass or less, and further more preferably 5% by mass or more and 15% by mass or less. If the content is 1% by mass or more, sufficient conductivity can be retained. Besides, if the content is 25% by mass or less, the ratio in mass of the active material can be large, and hence, a capacity per mass can be large.

(Binder)

A binder is not especially limited, and for example, polyvinylidene fluoride, a vinylidene fluoride-hexafluoropropylene copolymer, a vinylidene fluoride-tetrafluoroethylene copolymer, a styrene-butadiene copolymer rubber, polytetrafluoroethylene, polypropylene, polyethylene, polyimide, polyamide imide and the like can be used. The amount of the binder for the negative electrode to be used is preferably 7 to 20 parts by mass based on 100 parts by mass of the negative electrode active material from the viewpoint of "sufficient binding force" and "high energy" that are in a trade-off relationship.

From the viewpoint of a binding property with a conductive intermediate layer, the binder is preferably polyimide or polyamide imide. Besides, as a precursor of the binder, a polyamic acid is preferably used, and the same polyamic acid as that used in the conductive intermediate layer is more preferably used.

Now, the constitution of the battery except for the negative electrode will be described.

<Constituting Elements of Positive Electrode>

In the present embodiment, a positive electrode active material is not especially limited as long as it can absorb and desorb a lithium ion respectively in charging and in discharging, and for example, a known active material can be used. The positive electrode active material is preferably a lithium transition metal oxide. The lithium transition metal oxide is not especially limited, and examples include a lithium manganate having a layered structure or a lithium manganate having a spinel structure, such as $LiMnO_2$ or $Li_xMn_2O_4$ (0<x<2); $LiCoO_2$, $LiNiO_2$, or any of these in which a part of the transition metal is replaced with another metal; a lithium transition metal oxide in which a specific transition metal does not exceed half the number of transition metals, such as $LiNi_{1/3}Co_{1/3}Mn_{1/3}O_2$; one having an olivine structure, such as $LiFePO_4$; and these lithium transition metal oxides in which Li is more excessive than in a stoichiometric composition. In particular, $Li_\alpha Ni_\beta Co_\gamma Al_\delta O_2$ (1≤α≤1.2, β+γ+δ=1, β≥0.7, γ≤0.2) or $Li_\alpha Ni_\beta Co_\gamma Mn_\delta O_2$ (1α≤1.2, β+γ+δ=1, β≥0.6, γ≤0.2) is preferred. These materials can be used alone, or in combinations of two or more.

The positive electrode of the present embodiment may also contain, in addition to the positive electrode active material, a positive electrode conductivity imparting agent and a positive electrode binder.

As the positive electrode conductivity imparting agent, the carbon materials mentioned above as the examples of the negative electrode conductivity imparting agent, a metallic substance such as aluminum, a powder of a conductive oxide and the like can be used.

The positive electrode binder is not especially limited, and for example, polyvinylidene fluoride, a vinylidene fluoride-hexafluoropropylene copolymer, a vinylidene fluoride-tetrafluoroethylene copolymer, a styrene-butadiene copolymer rubber, polytetrafluoroethylene, polypropylene, polyethylene, polyimide, polyamide imide and the like can be used. Among these, polyvinylidene fluoride (PVdF) is preferably used from the viewpoint of versatility and low cost.

The content of the positive electrode binder in a positive electrode active material layer is preferably 1% by mass or more and 25% by mass or less, more preferably 2% by mass or more and 20% by mass or less, and further more preferably 5% by mass or more and 15% by mass or less. If the content is 1% by mass or more, the occurrence of electrode peeling can be prevented. Besides, if the content is 25% by mass or less, the ratio in mass of the positive electrode active material can be large, and hence, a capacity per mass can be large.

As a positive electrode collector, from the viewpoint of electrochemical stability, nickel, copper, silver, aluminum and an alloy of these are preferred. Examples of the shape include a foil, a plate and a mesh. In particular, an aluminum foil is preferably used.

To the positive electrode active material layer containing the positive electrode active material, a conduction aid may be added for purpose of lowering impedance. An example of the conduction aid includes a carbonaceous fine particle such as graphite, carbon black or acetylene black.

The positive electrode can be produced, for example, by preparing a positive electrode slurry by mixing a lithium manganese composite oxide, a conductivity imparting agent and a positive electrode binder, and applying the positive electrode slurry on a positive electrode collector.

<Electrolyte>

As an electrolyte, for example, a liquid electrolyte (an electrolyte solution) can be used. In a preferable embodiment, although not especially limited, for example, an electrolyte solution containing an electrolyte salt and a nonaqueous electrolyte solvent is used.

The nonaqueous electrolyte solvent is not especially limited, and from the viewpoint of stability at a metallic lithium potential, examples include cyclic carbonates such as propylene carbonate, ethylene carbonate, butylene carbonate and vinylene carbonate; chain carbonates such as dimethyl carbonate, diethyl carbonate, ethyl methyl carbonate and dipropyl carbonate; and lactones such as γ-butyrolactone. The nonaqueous electrolyte solutions can be used alone, or in combinations of two or more.

The electrolyte salt is not especially limited, and examples include lithium salts such as $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$ and $LiN(CF_3SO_2)_2$. These electrolyte salts can be used alone, or in combinations of two or more.

Alternatively, an ionic liquid can be used as the electrolyte solution. An example of the ionic liquid includes a quaternary ammonium-imide salt.

Alternatively, a solid electrolyte may be used instead of the liquid electrolyte. Examples of the solid electrolyte include a gel electrolyte obtained by impregnating, with any of the above-described electrolyte solutions, a polymer such as polyacrylonitrile or polyacrylate, and a solid electrolyte such as LiPON or $Li_2S$—$LiP_xO_y$ (x=1 to 2, y=2 to 4).

<Separator>

A separator is not especially limited, and for example, a known separator can be employed. As the separator, for example, a porous film or a nonwoven fabric of polypropylene, polyethylene or the like can be used. Alternatively, a film of polyimide or aramid, a film of cellulose, or the like can be used.

<Outer Package>

An outer package is not especially limited, and any outer package can be used as long as it is stable against an electrolyte solution and has a sufficient water vapor barrier property. As the outer package, for example, a metal can of iron, an aluminum alloy or the like, a laminate film, or the like can be used. As the laminate film, a laminate film on which aluminum or silica is vapor deposited is preferably used from the viewpoint of the water vapor barrier property.

<Constitution of Battery>

The constitution of the secondary battery of the present embodiment is not especially limited, and for example, a constitution in which an electrode element including a positive electrode and a negative electrode opposing each other, and an electrolyte solution are packed in an outer package can be employed. The shape of the secondary battery is not especially limited, and examples include a cylindrical type, a flat rolled rectangular type, a stacked rectangular type, a coin type, a flat rolled laminate type, and a stacked laminate type.

Figure 1:
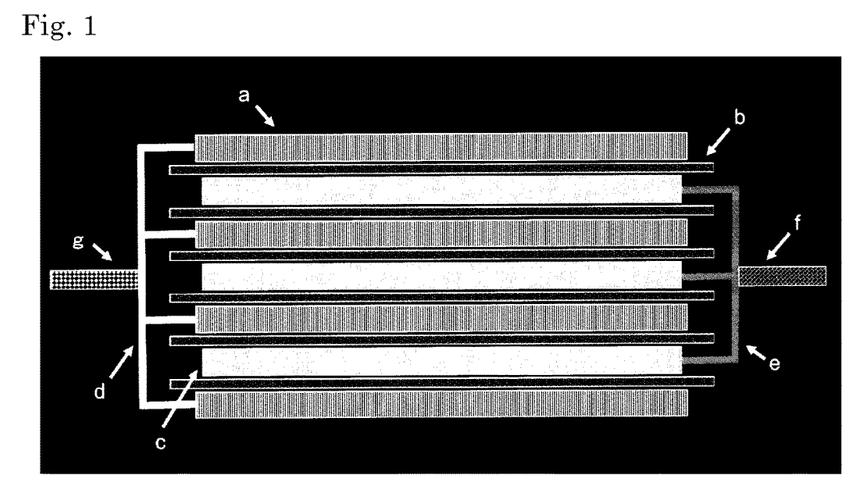
FIG. 1 is a schematic cross-sectional view illustrating the structure of a stacked laminate type secondary battery.

Now, a stacked laminate type secondary battery will be described as an example. FIG. 1 is a schematic cross-sectional view illustrating the structure of an electrode element included in a stacked type secondary battery using a laminate film as the outer package. This electrode element is formed by alternately stacking a plurality of positive electrodes c and a plurality of negative electrodes a with a separator b sandwiched therebetween. Positive electrode collectors e of the respective positive electrodes c are mutually welded at their ends not covered by a positive electrode active material to be electrically connected to one another, and a positive terminal f is further welded to the welded portion. Negative electrode collectors d of the respective negative electrodes a are mutually welded at their ends not covered by a negative electrode active material to be electrically connected to one another, and a negative terminal g is further welded to the welded portion.

The electrode element having such a planar stacked structure does not have a portion with a small R (a region close to a rolling core of a coaxially rolled structure, or a folded region corresponding to an end of a flat rolled structure), and therefore, has an advantage that this electrode element is difficult to be harmfully affected in the volume change of the electrode through charging/discharging as compared with an electrode element having a rolled structure. In other words, it is effectively used as an electrode element using an active material easily causing the volume expansion. On the other hand, since an electrode is bent in an electrode element having a rolled structure, the structure of the electrode element is easily deformed when the volume change occurs. In particular, if a negative electrode active material that undergoes large volume change through the charging/discharging, such as silicon oxide, is used, it is presumed that the capacity is largely lowered through the charging/discharging in a secondary battery using an electrode element having a rolled structure.

EXAMPLES

Specific examples of the present embodiment will now be described, and it should be noted that the present embodiment is not limited to these examples.

Example 1

Preparation of Negative Electrode

SiO (trade name: "SIO05PB", manufactured by Kojundo Chemical Laboratory Co., Ltd.), carbon black (trade name: "#3030B", manufactured by Mitsubishi Chemical Corporation) and a polyamic acid (trade name: "U-Varnish A", manufactured by Ube Industries, Ltd.) were weighed at a mass ratio of 80:5:15. These were mixed with N-methylpyrrolidone (NMP) by using a homogenizer to give a slurry. A mass ratio between the NMP and a solid content was set to 57:43. The slurry was applied on a copper foil by using a doctor blade. Thereafter, the resultant was heated at 120° C. for 7 minutes for drying the NMP. Then, the resultant was heated at 350° C. for 30 minutes under a nitrogen atmosphere by using an electric furnace, and thus, a negative electrode was prepared.

A lithium foil was brought into contact with the negative electrode and kept at 85° C. for 8 hours under a nitrogen atmosphere. On the basis of the weight change of the negative electrode, the amount of lithium doped in the negative electrode was obtained. The amount of lithium doped per mol of SiO was 1.62 mol.

Thereafter, the negative electrode was electrochemically doped with lithium by using a beaker cell. A metallic lithium foil was used as a counter electrode of the beaker cell, and a solution containing 1.0 mol/l of $LiPF_6$ and a mixed solvent (7:3 (in a volume ratio)), as a nonaqueous electrolyte solvent, of ethylene carbonate and diethyl carbonate was used as an electrolyte solution. The amount of lithium doped in the negative electrode was obtained on the basis of a Coulomb amount. The amount of lithium doped per mol of SiO was 1.78 mol.

(Preparation of Positive Electrode)

Lithium cobaltate (manufactured by Nichia Corporation), carbon black (trade name: "#3030B", manufactured by Mitsubishi Chemical Corporation) and polyvinylidene fluoride (trade name: "#2400", manufactured by Kureha Corporation) were weighed at a mass ratio of 95:2:3. These were mixed with NMP to give a slurry. The mass ratio between the NMP and a solid content was set to 52:48. The slurry was applied to an aluminum foil with a thickness of 15 μm by using a doctor blade. The aluminum foil on which the slurry was applied was heated at 120° C. for 5 minutes for drying the NMP, and thus, a positive electrode was prepared.

(Assembly of Secondary Battery)

An aluminum terminal and a nickel terminal were welded respectively to the positive electrode and the negative electrode thus prepared. These were stacked with separators sandwiched therebetween to prepare an electrode element. Incidentally, the masses of the positive electrode and the negative electrode were adjusted so that the amount of lithium doped in the SiO, that is, the negative electrode active material, could be an arbitrary value when the battery was in a fully charged state. A nickel terminal was welded to a reference electrode prepared by adhering a copper foil to metallic lithium, and the resultant was stacked on the negative electrode with a separator sandwiched therebetween. The electrode element and the reference electrode were packed in a laminate film, and an electrolyte solution was injected to the inside of the laminate film. Thereafter, the laminate film was sealed by heat bonding while reducing the pressure within the laminate film. In this manner, a planar secondary battery before initial charging was prepared. Herein, a polypropylene film was used as the separator. As the laminate film, a polypropylene film on which aluminum was vapor deposited was used. As the electrolyte solution, a solution containing 1.10 mol/l of $LiPF_6$ as an electrolyte and a mixed solvent (in 7:3 (in a volume ratio)) of ethylene carbonate and diethyl carbonate as a nonaqueous electrolyte solvent was used.

(Charge/Discharge Cycle Test of Secondary Battery)

The secondary battery prepared as described above was subjected to a charge/discharge cycle test in a range of a battery voltage of 2.5 to 4.2 V. The charging was performed by a CCCV method, and after a voltage of 4.2 V was attained, the voltage was kept constant for 1 hour. The discharging was performed by a CC method (at a constant current of 0.2 C). Here, the 0.2 C current means a current at which it takes 5 hours to completely discharge an arbitrary battery in a fully charged state if the battery is discharged at a constant current. The results of initial charge/discharge efficiency and a cycle characteristic are shown in Table 1.

(NMR Measurement)

The secondary battery prepared as described above was charged once, and then, the battery was disassembled in an argon atmosphere to take out the negative electrode, and a negative electrode layer peeled off from the collector was put in a sample tube to be used as an NMR measurement sample. This sample was used for measuring solid state NMR (29SiDD/MAS), so that peaks could be analyzed by the method described above to obtain areas of S1, S2 and S3. The results of S1/(S1+S2+S3) and S3/(S1+S2+S3) are shown in Table 1.

Example 2

A heating time employed for the thermal doping of lithium in a negative electrode was set to 6 hours. The resultant doping amount was 1.39 mol. In addition, an amount of lithium doped attained by using a beaker battery was changed to 2.01 mol. Except for these, a battery was prepared and evaluated in the same manner as in Example 1.

Example 3

A heating time employed for the thermal doping of lithium in a negative electrode was set to 4 hours. The resultant doping amount was 1.21 mol. In addition, an amount of lithium doped attained by using a beaker battery was changed to 2.19 mol. Except for these, a battery was prepared and evaluated in the same manner as in Example 1.

Example 4

A heating time employed for the thermal doping of lithium in a negative electrode was set to 2 hours. The resultant doping amount was 1.02 mol. In addition, an amount of lithium doped attained by using a beaker battery was changed to 2.38 mol. Except for these, a battery was prepared and evaluated in the same manner as in Example 1.

Comparative Example 1

A heating time employed for the thermal doping of lithium in a negative electrode was set to 18 hours. The resultant doping amount was 3.14 mol. The lithium doping by using a beaker battery was not performed. Except for these, a battery was prepared and evaluated in the same manner as in Example 1.

Comparative Example 2

The thermal lithium doping of a negative electrode was not performed. In addition, an amount of lithium doped attained by using a beaker battery was changed to 3.40 mol. Except for these, a battery was prepared and evaluated in the same manner as in Example 1.

Comparative Example 3

Neither the thermal lithium doping nor the lithium doping by using a beaker battery in a negative electrode was performed. Except for these, a battery was prepared and evaluated in the same manner as in Example 1.

It is understood from the results shown in Table 1 that the initial charge/discharge efficiency is high but the capacity retention ratio after 200 cycles is low in Comparative Examples 1 and 2, and that the capacity retention ratio after 200 cycles is high but the initial charge/discharge efficiency is low in Comparative Example 3. In all the examples, both the initial charge/discharge efficiency and the capacity retention ratio after 200 cycles are high, and thus, it was revealed that the present invention provides a secondary battery having a high energy density and a good charge/discharge cycle characteristic. In addition, it is understood, based on peaks of the NMR, that the ratio of the silicon having a Si—Si bond is higher in Comparative Examples 1 and 2 than in Comparative Example 3. On the contrary, in all the examples, the ratio of the silicon having a Si—Si bond is suppressed to the same extent as in Comparative Example 3. It seems that since the examples are successful in increasing the ratio of the silicon having the $Si(OLi)_{4-n}(OSi)_n$ (n=0, 1, 2, 3) structure while suppressing the ratio of the silicon having a Si—Si bond to be low, both the charge/discharge efficiency and the capacity retention ratio can be increased.

The invention claimed is:

1. An active material for use in a negative electrode comprising silicon oxide which satisfies the following Equation 1 and Equation 2 when solid state NMR ($^{29}$Si-DDMAS) of silicon is measured for the silicon oxide after performing charging at least once, $$0.42 \leq S1/(S1+S2+S3) \leq 0.55 \qquad \text{(Equation 1)}$$

$$0.21 \leq S3/(S1+S2+S3) \leq 0.26, \qquad \text{(Equation 2)}$$

in which S1 is a sum of peak areas of a group of signals assigned to Si having a Si—Si bond and having peaks at 0 to −15 ppm, −55 ppm, −84 ppm and −88 ppm, S2 is a sum of peak areas of a group of signals assigned to Si having a $Si(OH)_{4-n}(OSi)_n$ (n=3, 4) structure and having peaks at −100 ppm and −120 ppm, and S3 is a sum of peak areas of a group of signals assigned to Si having a $Si(OLi)_{4-n}(OSi)_n$ (n=0, 1, 2, 3) structure and having peaks at −66 ppm, −74 ppm, −85 ppm and −96 ppm, wherein the silicon oxide is pre-doped with lithium first by thermal diffusion and, subsequently, by electrochemical means.

2. The active material according to claim 1, wherein conditions of the Equation 1 and Equation 2 are satisfied after performing the charging once.

3. A lithium secondary battery comprising a negative electrode comprising an active material according to claim 1, a binder and a collector, a positive electrode and an electrolyte.

TABLE 1

|  | Amount of lithium doped by thermal doping (molar ratio) | Amount of lithium doped by electrochemical doping (molar ratio) | S1/(S1 + S2 + S3) | S3/(S1 + S2 + S3) | Initial charge/discharge efficiency (%) | Capacity retention ratio after 200 cycles (%) |
|---|---|---|---|---|---|---|
| Comparative example 1 | 3.14 | — | 0.68 | 0.24 | 70 | 22 |
| Comparative example 2 | — | 3.40 | 0.61 | 0.23 | 74 | 31 |
| Comparative example 3 | — | — | 0.42 | 0.16 | 59 | 88 |
| Example 1 | 1.62 | 1.78 | 0.42 | 0.21 | 78 | 85 |
| Example 2 | 1.39 | 2.01 | 0.44 | 0.22 | 75 | 87 |
| Example 3 | 1.21 | 2.19 | 0.45 | 0.24 | 73 | 89 |
| Example 4 | 1.02 | 2.38 | 0.48 | 0.26 | 72 | 90 |

4. A method for manufacturing a negative electrode active material comprising silicon oxide, comprising a step of doping the silicon oxide with lithium,
wherein lithium is doped in the step of doping the silicon oxide with lithium so as to satisfies the following Equation 1 and Equation 2 when solid state NMR ($^{29}$Si-DDMAS) of silicon is measured for the silicon oxide after performing charging at least once, $$0.42 < S1/(S1+S2+S3) < 0.55 \quad \text{(Equation 1)}$$

$$0.21 < S3/(S1+S2+S3) < 0.26, \quad \text{(Equation 2)}$$

in which S1 is a sum of peak areas of a group of signals assigned to Si having a Si—Si bond and having peaks at 0 to −15 ppm, −55 ppm, −84 ppm and −88 ppm, S2 is a sum of peak areas of a group of signals assigned to Si having a $Si(OH)_{4-n}(OSi)_n$ (n=3, 4) structure and having peaks at −100 ppm and −120 ppm, and S3 is a sum of peak areas of a group of signals assigned to Si having a $Si(OLi)_{4-n}(OSi)_n$ (n=0, 1, 2, 3) structure and having peaks at −66 ppm, −74 ppm, −85 ppm and −96 ppm, wherein the silicon oxide is doped with lithium by (i) a method utilizing thermal diffusion of lithium and thereafter doped with lithium by (ii) a method of electrochemically doping lithium.

\* \* \* \* \*